United States Patent [19]

Colton

[11] 3,903,742

[45] Sept. 9, 1975

[54] DISPOSABLE RESPIRATORY PARAMETER SENSOR

[75] Inventor: Russell F. Colton, Cedar Rapids, Iowa

[73] Assignee: J-Tec Associates, Incorporated, Cedar Rapids, Iowa

[22] Filed: Feb. 6, 1974

[21] Appl. No.: 440,056

[52] U.S. Cl. ............................ 73/194 B; 128/2.08
[51] Int. Cl.² ..... A61B 5/08; G01F 1/32; G01F 1/66
[58] Field of Search ...... 73/194 A, 194 B; 128/2.08, 128/ DIG. 29

[56] References Cited
UNITED STATES PATENTS

| | | | |
|---|---|---|---|
| 3,680,375 | 8/1972 | Joy et al. | 73/194 |
| 3,709,213 | 1/1973 | Yard | 128/2.08 |
| 3,720,105 | 3/1973 | Cirulis | 73/194 |
| 3,741,014 | 6/1973 | Tamura | 73/194 |
| 3,756,078 | 9/1973 | Yamasani et al. | 73/194 |
| 3,788,141 | 1/1974 | Blackwell | 73/194 |

*Primary Examiner*—Herbert Goldstein
*Attorney, Agent, or Firm*—Griffin, Branigan and Butler

[57] ABSTRACT

A disposable device that uses vortex sensing techniques for sensing the rate of air flowing into and out of a person's lungs is disclosed. At least one strut is mounted in a longitudinal channel in a block. Extending outwardly from either end of the channel are tubes through which air entering or leaving the lungs of a person passes. Located on either side of the longitudinal channel are side channels adapted to house sonic transmitting and receiving transducers. A stretchable membrane covers the outer opening of the side channels and moves inwardly when the transducers are inserted into these channels to prevent unsterile transducers from contaminating the sterile longitudinal channel.

8 Claims, 2 Drawing Figures

DISPOSABLE RESPIRATORY PARAMETER SENSOR

BACKGROUND OF THE INVENTION

This invention relates to equipment for measuring the flow of air and more particularly to devices for measuring the flow of air inhaled and expelled by a person during a respiratory period.

A wide variety of devices for measuring respiratory parameters have been proposed and are in use. These devices range from simple pneumatic devices to complicated electro-mechanical devices. In the simple pneumatic devices, a person may blow into a tube and, thus, create a pressure that causes a needle or other indicator to change position. In the more recently developed and considerably more complicated electro-mechanical devices, a person may blow through a tube and cause turbine blades, for examples, to move. This movement is sensed by a suitable electronic means which generates an output indicating the rate of movement of the blades and thus the respiratory parameters.

One of the primary disadvantages of both the simple and the more complex devices is that they, in general, are not disposable. That is, these prior art devices are usually intended for reuse. Because they are reusable, they must be sterilized prior to each use by a new person or patient. In addition, the older relatively simple devices have the disadvantage that they are relatively inaccurate by modern standards. While the accuracy of some of the more recently developed electronic, electromechanical and the like devices is considerably better than older devices, their accuracy is still somewhat less than desired considering their complexity. In addition, the complexity of these devices makes them expensive and, therefore, not suitable for wide spread use. Further, because these devices are complex, they are somewhat more difficult to sterilize and maintain sterile prior to use.

Therefore, it is an object of this invention to provide a new and improved device for measuring respiratory parameters.

It is a further object of this invention to provide a new and improved respiratory parameter sensor which includes disposable components whereby resterilization of the device prior to a new use is unnecessary.

It is also an object of this invention to provide a disposable device that uses uncomplicated techniques for determining the rate of flow of air inhaled or exhaled by a person during a respiratory period.

SUMMARY OF THE INVENTION

In accordance with principles of this invention a disposable device for determining respiratory parameters is provided. The device comprises a block of material having a central channel. At least one strut is mounted in said channel. Two side channels are formed on either side of said strut but separated therefrom. Preferably, tubes project outwardly from either end of the central channel, and transducers of a sonic nature fit into the side channels. In accordance with vortex sensing technology, when a person blows into one of said tubes, vortices are created in the wake of the strut. These vortices can be sensed utilizing sonic velocity sensing techniques. The rate of generation of the vortices is related to the rate of air passage and, thus, respiratory parameters.

In accordance with further principles of this invention, two struts are mounted in said central channel, one on either side of said transducer channels whereby the device is bi-directional. In accordance with yet other principles of this invention, the transducers are mounted at a slight angle with respect to a plane orthogonaly intersecting the central channel. This offset prevents the transmitting sonic transducer from transmitting directly to the receiving sonic transducer.

In accordance with still further principles of this invention a flexible membrane is located about the block so as to cover the outer openings of the channels housing the sonic transducers. When the sonic transducers are inserted into their respective channels, they force the membrane inwardly. In this manner, the sonic transducers do not have to be sterile when in use. All that needs to be sterile is the block, the tubes, the strut and the membrane. Since these items can be easily and cheaply formed of inexpensive plastic, they can be made disposable. Thus, a disposable respiratory rate measuring device is provided by the invention.

It will be appreciated from the foregoing brief summary of the invention that a disposable device suitable for measuring respiratory parameters is provided. The disposable portion of the structure is formed of a block which preferably is formed of plastic, and a pair of tubes which may also be formed of plastic, if desired. The tubes extend outwardly from either end of a cylindrical passage in the block and create a passageway through which a patient can inhale and exhale air. The passage of air causes vortices to be created in the wake of struts which are sensed by a transducer arrangement. The transducer arrangement is separated from the main cylindrical passageway by a membrane which allows the transducers to be reused even though the transducers are unsterile because the membrane prevents their lack of sterility from contaminating the main air passageway.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF A PREFERRED EMBODIMENT

Prior to discussing a specific embodiment of the invention, reference is made to U.S. Pat. No. 3,680,375 issued Aug. 1,1972 to Robert D. Joy and Russell F. Colton and entitled "Sonic Velocity Sensing". That patent is referred to for its description of the use of sonic velocity techniques for sensing the velocity of air or other gases. Specifically, that patent sets forth in detail techniques for sensing velocity by placing a strut in a moving fluid field and detecting, using sonic techniques, the rate of occurrence of vortices in the wake of the strut. This invention is directed to using this basic technique in a respiratory measuring environment. More specifically, as hereinafter described, this invention relates to creating a partially disposable device which uses sonic velocity techniques for sensing the rate of air flow either into or out of a person's lungs.

Figure 1:
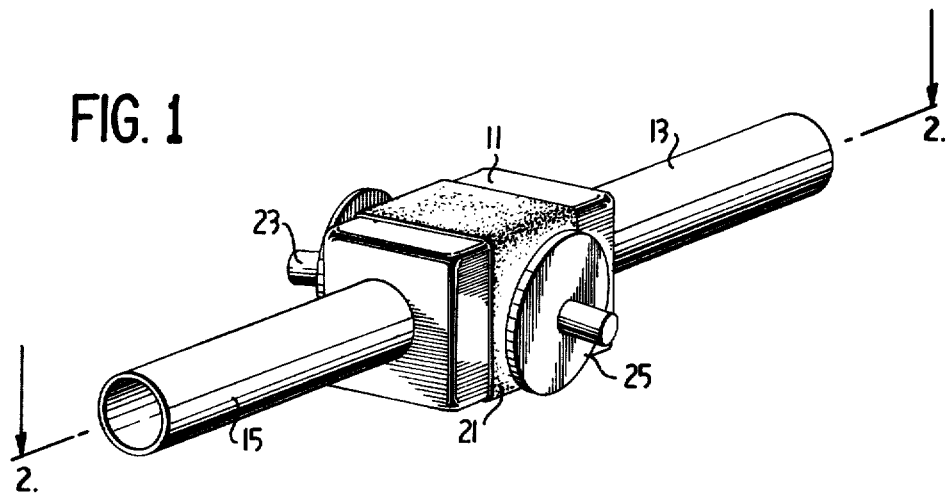
FIG. 1 is a pictorial diagram of a preferred embodiment of the invention.
Figure 2:
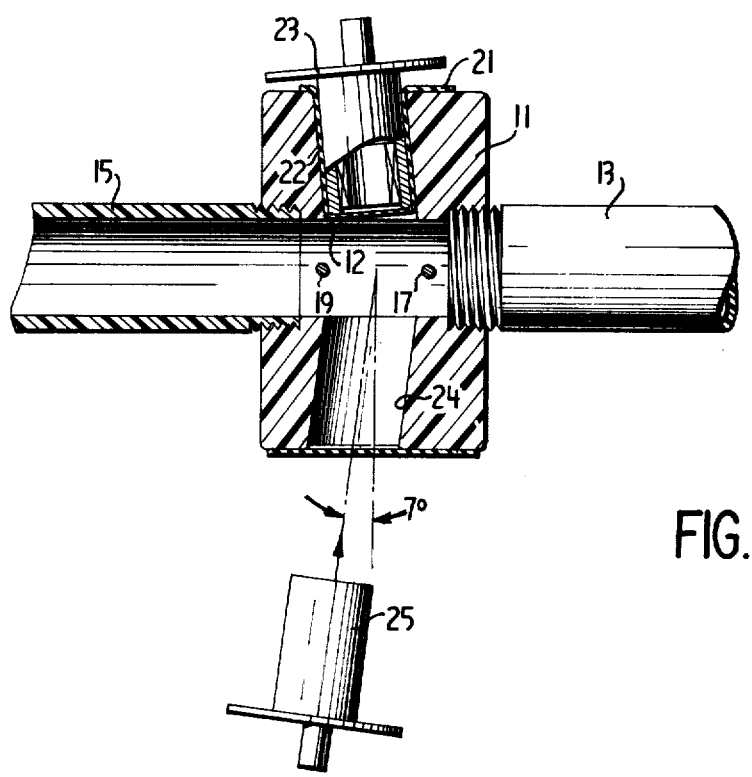
FIG. 2 is a cross-sectional diagram along line 2—2 of FIG. 1.

FIG. 1 illustrates a preferred embodiment of the invention that comprises a housing or block 11 preferably formed of plastic or the like. Formed in the block is a central cylindrical channel 12 (FIG. 2). Extending outwardly from either end of the central cylindrical channel 12 is a tube 13 or 15. The tubes are illustrated as threaded into the block 11 in a manner such that the inner diameter of the tubes aligns with the inner diameter of the channel 12 where it intersects the ends of the tubes 13 and 15. Thus, there is a relatively smooth surface where the tubes 13 and 15, and the block 11, join. Preferably, the tubes 13 and 15 are also formed of plastic. It should be noted, and will be appreciated by those skilled in the art and others, that the tubes 13 and 15 and the block 11 could be formed of a continuous plastic material and not separable, as illustrated.

A pair of struts 17 and 19 are mounted in the block 11. The struts may be formed of plastic or metal, as desired, and merely bisect the central channel 12 in the manner illustrated in FIG. 2

Located on either side of the central cylindrical channel 12 are side channels 22 and 24. The axes of the side channels intersect the central cylindrical channel 12 at points between the struts 19 and 17 and, preferably, lie in a first plane orthogonal to the plane defined by the two struts. The longitudinal axes of the side channels 22 and 24 are, however, offset by 7° from a second plane adapted to orthogonally intersect the plane defined by the struts 19 and 17 in the other direction and at 90° to the first plane as seen in FIG. 2. In other words, the channels 22 and 24 are, in general, orthogonal to the struts 17 and 19 but offset therefrom by an angle of about 7°, as illustrated in FIG. 2 to prevent a transmitting sonic transducer inserted in one side channel from transmitting directly to a receiving sonic transducer inserted in the other side channel.

Normally wrapped around the outer periphery of the block 11 so as to enclose the entrances to the side channels 22 and 24, as best illustrated at the bottom of FIG. 2, is a flexible membrane 21. The flexible membrane is adapted to allow sonic transmitting and receiving transducers 23 25 to be inserted into the side channels without contaminating the central channel 12, as illustrated at the top of FIG. 2 where sonic transducer 23 is illustrated as inserted into channel 22.

When a person inhales or exhales through the structure illustrated in the drawings by inserting one of the tubes 13 or 15 into his mouth and inhaling and exhaling through his mouth, the air flow creates a vortex in the wake of one of the struts 17 and 19. Depending upon the direction of flow, the vorticies in the wake of the struts will flow past the transducers, assuming that they have been inserted into their respective channels. A sonic signal directed toward these vortices is modulated by them, as described in U.S. Pat. NO. 3,680,375. Thus, one of the transducers transmits a sonic signal and the other receives a modulated sonic signal. The modulation frequency of the received signal is related to the rate of air flow which in turn is related to various respiratory parameters. For example, rate of breathing information is obtained. In addition, the volume of air inhaled and exhaled can be determined since the size of the central channel is known. This and other respiratory information is easily generated when the transducers are connected to any electronic means adapted to interpret the received signals in the desired manner.

It will be appreciated from the foregoing description of the invention that an inexpensive, disposable device suitable for sensing respiratory parameters is provided. While the device could be produced with built-in sonic transmitting and receiving transducers and still be disposable, it would be somewhat more expensive than desirable. The use of a membrane 21 which does not inhibit the transmission and reception of sonic signals, if it is suitably formed of a thin rubber or plastic, eliminates even the necessity of including transducers or sterilizing them. Thus, in accordance with the invention only the block, the tubes, the struts and the membrane must be sterile prior to use. These items which form the heart of the invention can be sterilized and then placed in a sterile plastic container until used. Prior to use, the transducers 23 and 25 are inserted into their side channels 22 and 24. The transducers do not have to be sterile because the membrane 21 prevents them from coming into contact with the sterile inner region of the device and contaminating that region. Hence, an uncomplicated, inexpensive device for measuring the breathing rate and other respiratory parameters of a person is provided by the invention. Because the device uses sonic velocity sensing techniques, it is extremely accurate. Moreover, because is uses such techniques it does not require the inclusion of movable mechanical components. All that is required, in addition to the structure specifically illustrated and described, is an uncomplicated electronic means for causing one of the transducers to emit a sonic signal and an uncomplicated means for interpreting the modulations of the signal received by the other transducer, plus an indicator means for indicating the rate of modulation which is related to the rate of air flow and breathing. Hence, the device is not only uncomplicated in structure, but it also uses uncomplicated electronic components for interpretation. Thus, the device is suitable for wide spread use.

While a preferred embodiment of the invention has been illustrated and described, it will be appreciated by those skilled in art and others that various changes can be made therein without departing from the spirit and scope of the invention. Hence, the invention can be practiced otherwise than as specifically described herein.

The embodiments of the invention in which an exclusive property or privilege is claimed are defined as follows:

1. A disposable respiratory parameter sensor comprising:
   a housing having a channel extending therethrough;
   a strut mounted in said channel so that a fluid passing through said channel creates a vortex in the wake of said strut;
   first and second side channels extending from the surface of said housing to intersect said channel extending through said housing, the axes of said side channels being directed toward the region where said vortex is created; and
   a disposable flexible membrane material normally covering the ends of said side channels at the surface of said housing, said flexible membrane material being stretchable into said side channels whereby said channel extending through said housing is isolated from contamination by any objects inserted into said side channels.

2. A parameter sensor as claimed in claim 1 and further comprising a sonic transmitter and a sonic receiver, all said channels being sterilized and said first and second side channels being adapted to receive said sonic transmitter and said sonic receiver, respectively, by stretching said membrane into said side channels and over said transmitter and receiver as they are inserted into said side channels, said transmitter and receiver being easily removable from said side channels before disposal of said housing and said membrane material.

3. A parameter sensor as claimed in claim 1 wherein said flexible membrane material comprises a closed loop band extending around said housing.

4. A parameter sensor as claimed in claim 1 and further comprising a second strut mounted in the channel extending through the housing, said struts being disposed in the same plane, fluid passing through said channel in one direction creating a vortex in the wake of one strut and fluid passing through said channel in the opposite direction creating a vortex in the wake of the second strut, said vortices being created in the region between said struts.

5. A parameter sensor as claimed in claim 2 wherein the axes of said side channels are at an angle with respect to each other, but lie in the same plane, whereby sonic signals from said transmitter are not directly received by said receiver.

6. A disposable respiratory parameter sensor comprising:

a block formed of a disposable material having a central channel extending therethrough;

a strut mounted in said central channel so that a fluid passing through said central channel creates vortices in the wake of said strut;

first and second side channels, each extending from the exterior of said block to said central channel and at an angle with respect to said central channel, one of said side channels being adapted to house a sonic transmitting transducer and the other of said side channels being adapted to house a sonic receiving transducer; and, a flexible membrane located about said block so as to enclose the openings formed in the exterior of said block by said first and second side channels, said flexible membrane being adapted to move inwardly when said sonic transmitting and receiving transducers are inserted into said first and second side channels so as to prevent said transducers from contaminating the interior of said block.

7. A disposable respiratory parameter sensor as claimed in claim 6 and further comprising first and second tubes, each tube being aligned with said central channel and connected to one end of said central channel.

8. A disposable respiratory parameter sensor as claimed in claim 7 wherein said block and said tubes are formed of plastic.

* * * * *